(12) United States Patent
Singh

(10) Patent No.: US 8,397,963 B2
(45) Date of Patent: Mar. 19, 2013

(54) AUTOMOBILE CADDY

(76) Inventor: Neeraj Singh, McDonough, GA (US)

( * ) Notice: Subject to any disclaimer, the term of this patent is extended or adjusted under 35 U.S.C. 154(b) by 342 days.

(21) Appl. No.: 12/661,931

(22) Filed: Mar. 26, 2010

(65) Prior Publication Data

US 2011/0233245 A1 Sep. 29, 2011

(51) Int. Cl.
*B60R 7/00* (2006.01)
*A47C 7/62* (2006.01)

(52) U.S. Cl. ............. 224/275; 297/188.04; 297/188.06; 224/926; 224/321; 224/564; 248/218.4

(58) Field of Classification Search ................ 224/275, 224/925, 926, 927, 522, 523, 524, 321, 564, 224/565, 42.38, 929, 550, 558, 555; 297/169, 297/188.2, 188.06, 188.04; 312/235.8; 248/214, 248/219.1, 218.4, 241, 242, 256, 257, 324
See application file for complete search history.

(56) References Cited

U.S. PATENT DOCUMENTS

| | | | | |
|---|---|---|---|---|
| 3,951,486 A | * | 4/1976 | Tracy | 312/235.8 |
| 4,298,298 A | * | 11/1981 | Pontone | 411/342 |
| D268,094 S | * | 3/1983 | Radmaker | D8/399 |
| 4,757,928 A | | 7/1988 | Browne | |
| 4,765,583 A | * | 8/1988 | Tenner | 248/444 |
| 5,312,160 A | | 5/1994 | Davis et al. | |
| D356,468 S | * | 3/1995 | Beck et al. | D6/406.5 |
| 5,415,457 A | * | 5/1995 | Kifer | 297/188.04 |
| 2008/0128460 A1 | * | 6/2008 | Adler et al. | 224/275 |
| 2008/0208694 A1 | * | 8/2008 | Baggott | 705/14 |

FOREIGN PATENT DOCUMENTS

GB 2239639 A * 7/1991 ..................... 224/275

* cited by examiner

*Primary Examiner* — Nathan J Newhouse
*Assistant Examiner* — Matthew Theis
(74) *Attorney, Agent, or Firm* — Bradley D. Crose; Crose Law LLC

(57) ABSTRACT

The auto caddy of the present invention may include a main housing having one or more receptacles for holding drinks or other items, and may include one or more attachment members having one or more sets of openings through which a vehicle headrest seat post may extend on installation with two points of contact, which may increase the stability of the auto caddy, especially during sudden movement of a vehicle. The auto caddy may include optional components for subdividing receptacles, one or more hooks from which a tray may be suspended, a strap for securing the tray, and slots for suspending a trash receptacle such as a plastic grocery bag. The auto caddy may also include offset sides for manufacturing cost efficiency, in which case offset washers (which may be hook-shaped) may be used at installation to maximize vertical and horizontal alignment and stability of the auto caddy.

20 Claims, 16 Drawing Sheets

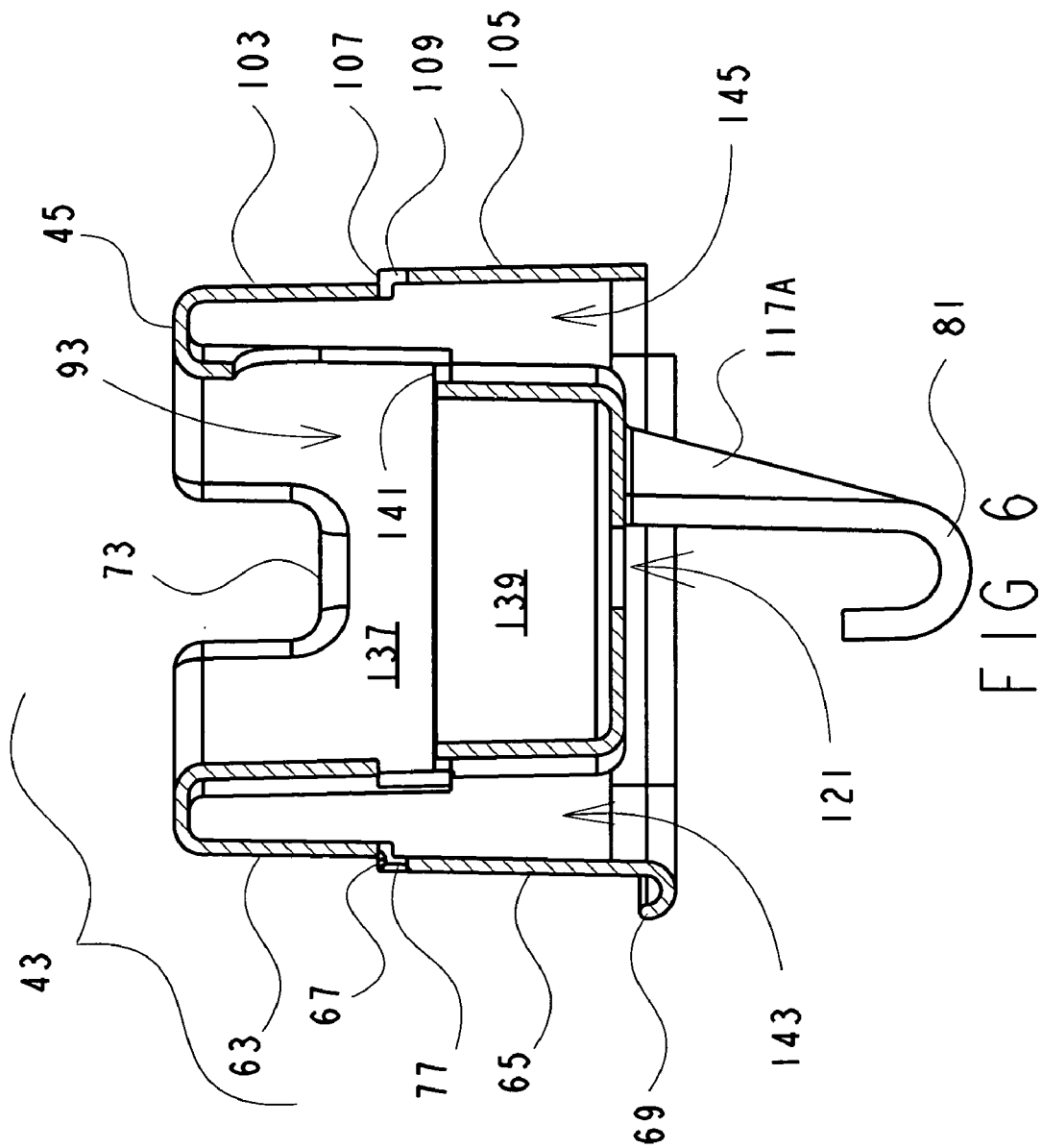

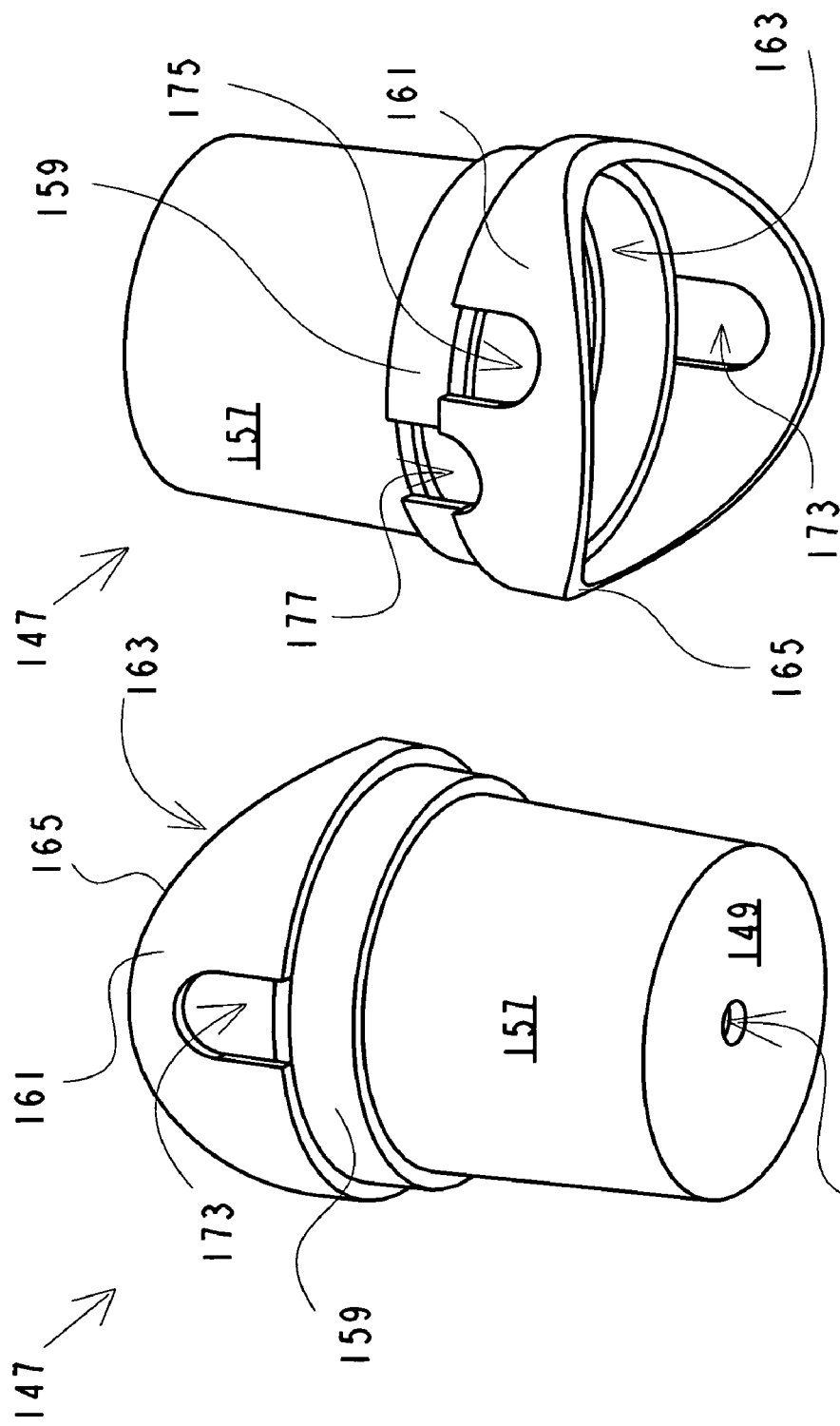

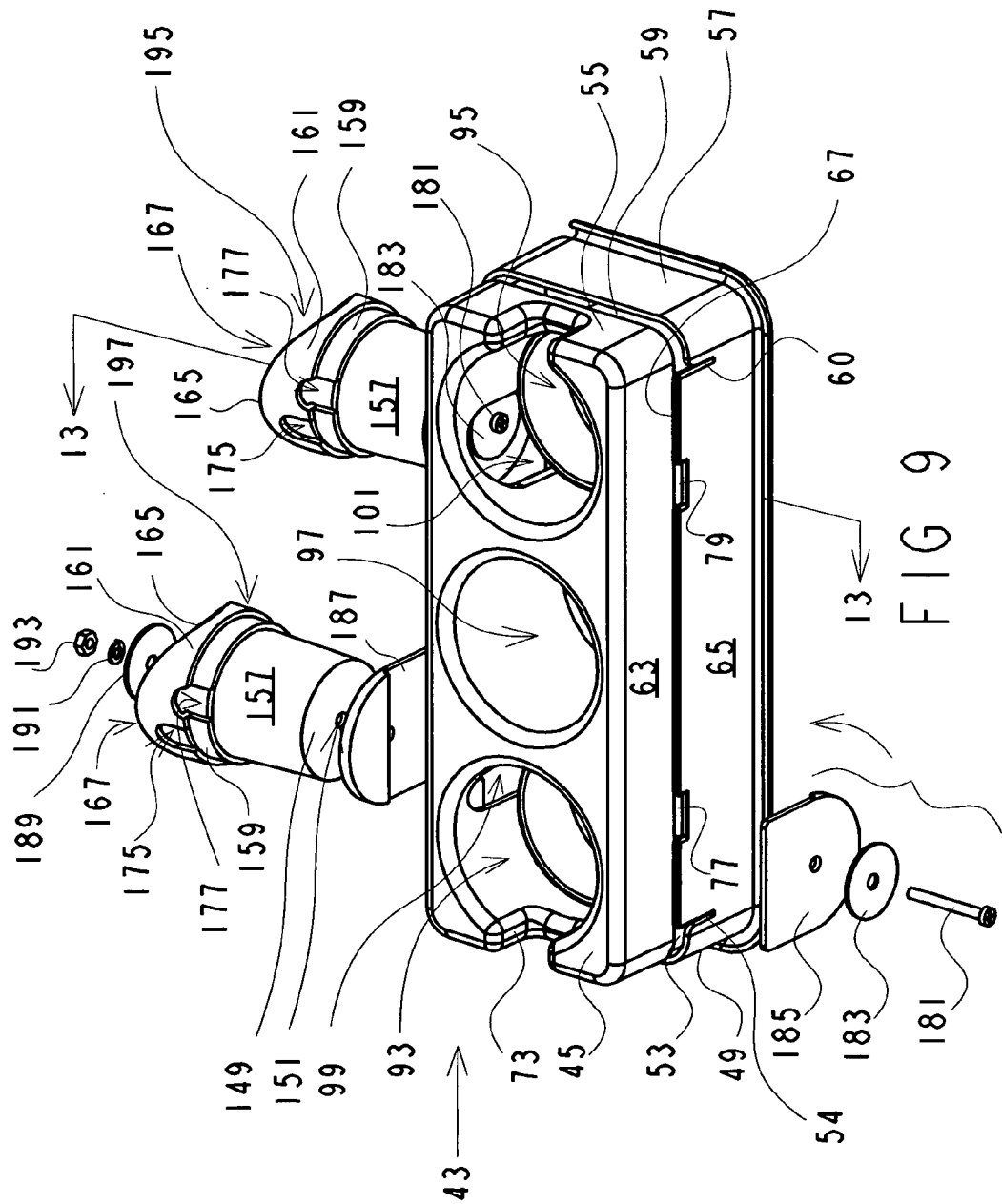

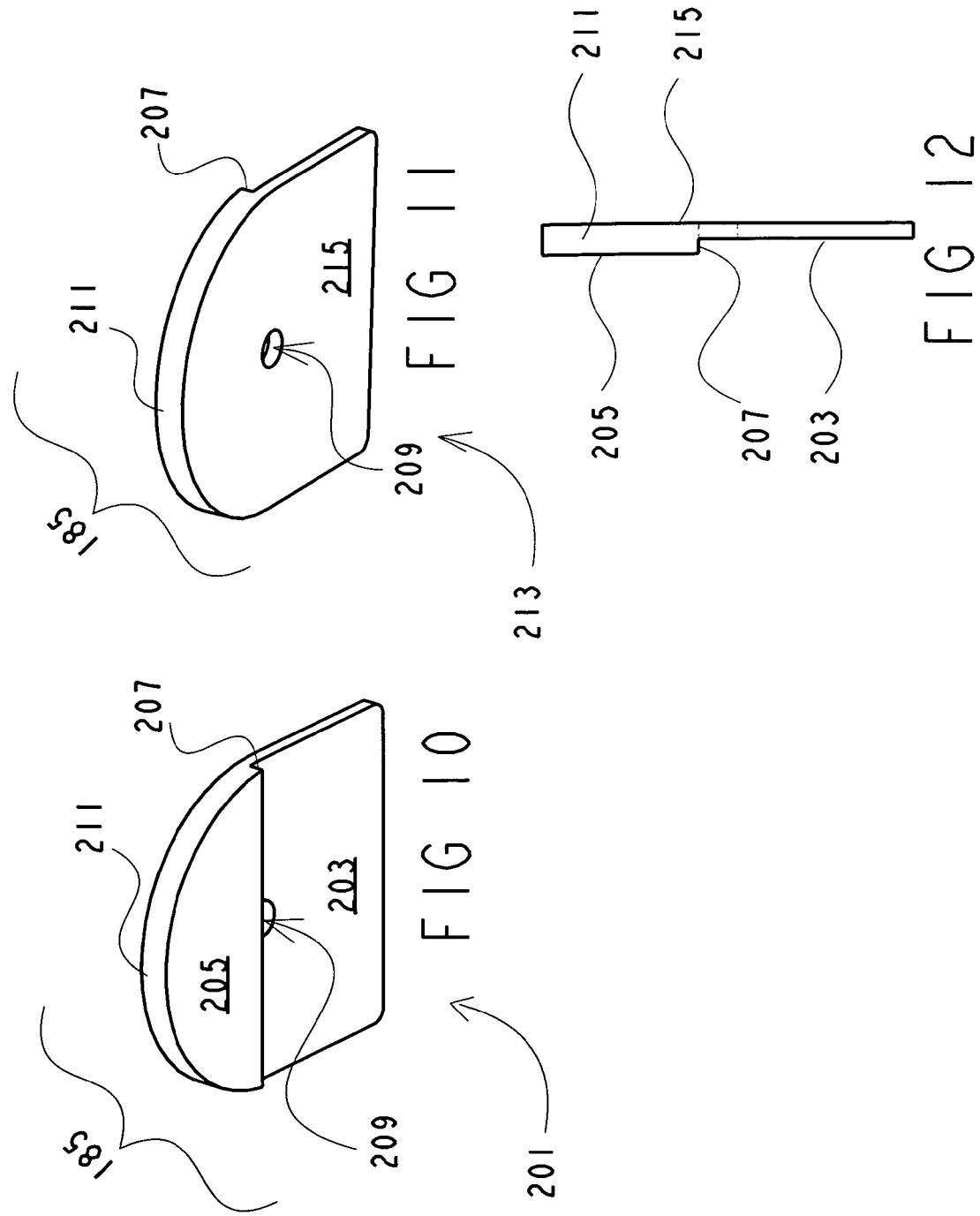

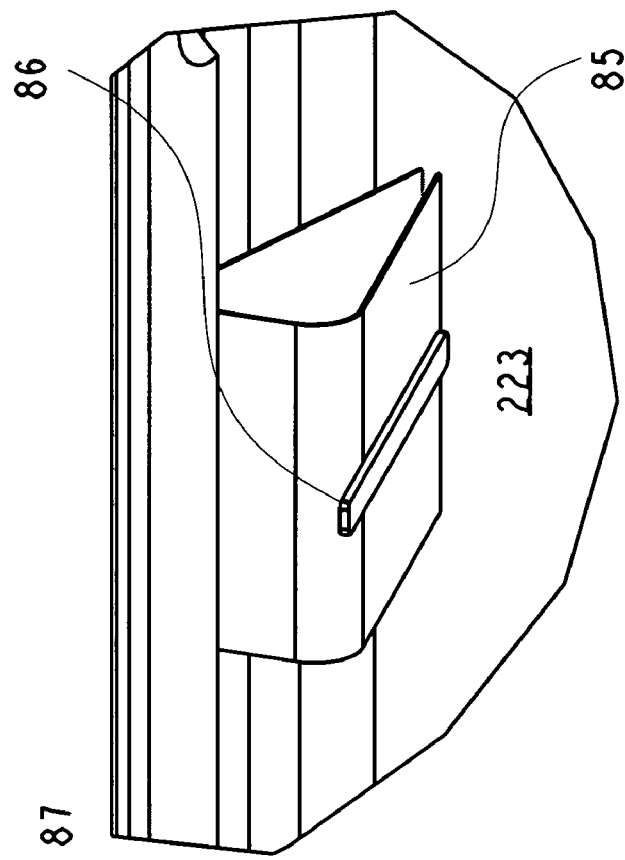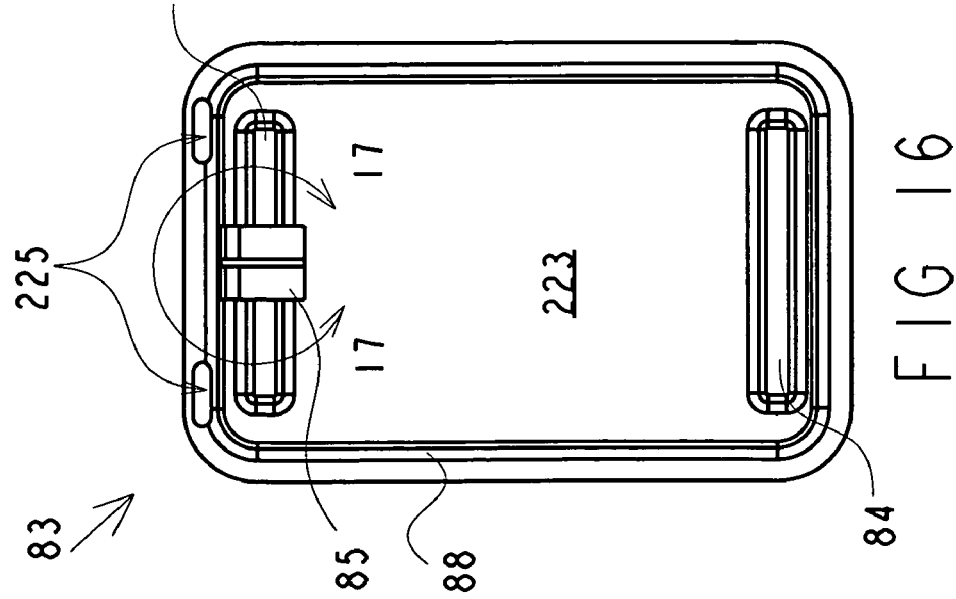

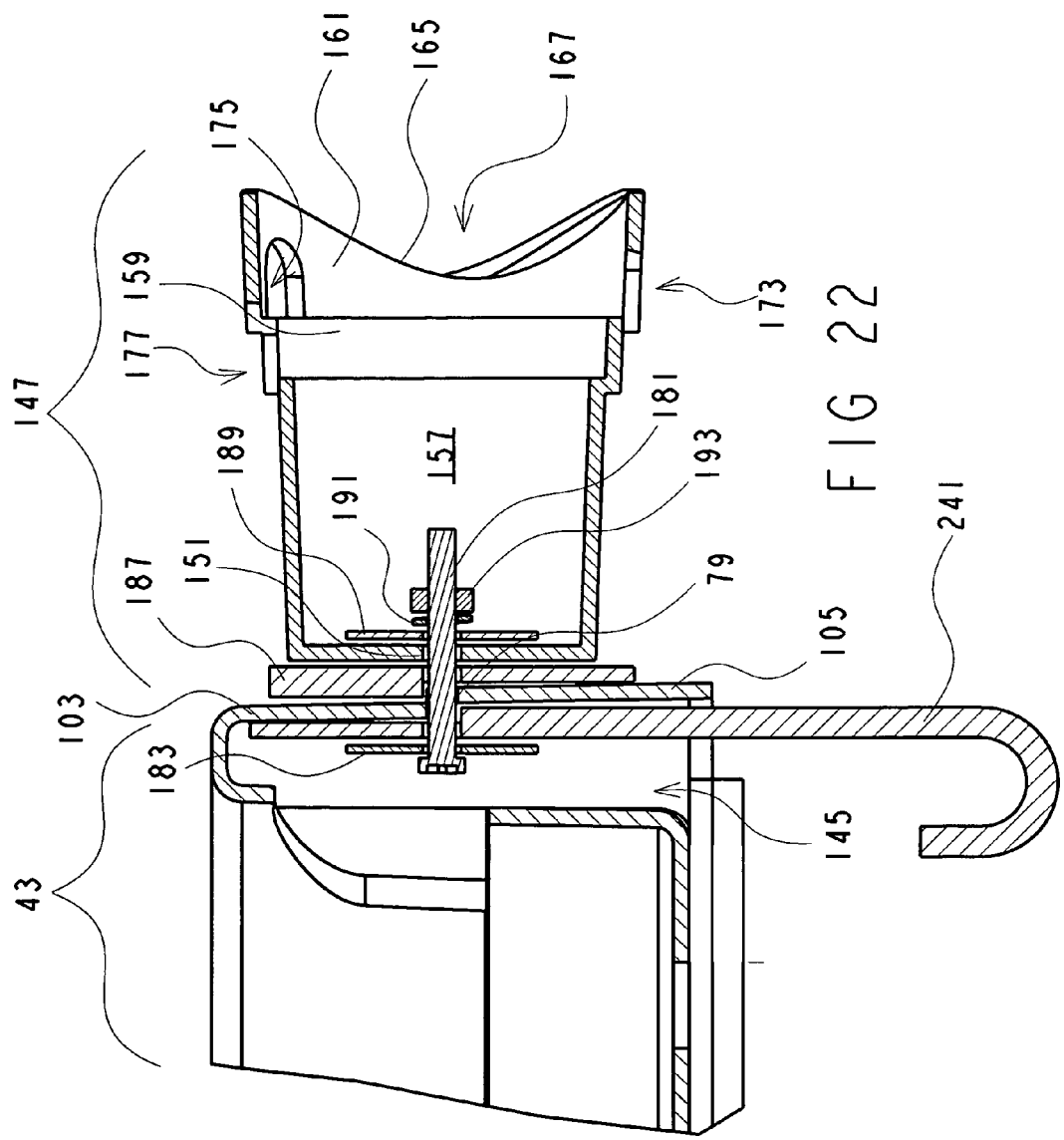

AUTOMOBILE CADDY

FIELD OF THE INVENTION

The present invention relates to the field of automobile caddies, and more particularly to a multi-purpose automobile caddy which may be stably mounted so that it may be used in a vehicle, and more particularly may be safely used in a moving vehicle as an organizer, a cupholder, an eating and/or working surface, and/or a trash receptacle holder.

BACKGROUND OF THE INVENTION

Although auto caddies are well known and widely available, few, if any, offer a high degree of functionality in combination with secure, highly stable installation and safe operation. One of the more well-known conventionally available auto caddies is designed to sit on an auto seat, in either the front or rear of a vehicle. The middle seatbelt is generally used to restrict movement of this type of caddy during stops and starts, sharp turns, and other sudden vehicular movements. Typically, however, large drinks or top-heavy items housed in this kind of caddy may be easily dislodged and ejected from the caddy into the interior of the vehicle, potentially staining the vehicle interior or even causing injury to occupants where hot liquids are involved. Additionally, use of this caddy precludes a middle rider in the front or rear of the vehicle because the caddy occupies the middle seat and the middle seatbelt. Further, this type of caddy can generally only be used in vehicles that have a bench seat; it may not usually be used in vehicles with individualized bucket seats or consoles unless it is used in a primary seating position such as a passenger's seat, which is typically not feasible.

Other conventionally available automobile caddies are designed to be strapped to the headrest of a seat, more specifically to the headrest extension posts along which a headrest is generally adjustable. Most of these caddies include a strap with a buckle or closure that allows it to be extended around the headrest extension posts so that the caddy unit is suspended adjacent the back of the seat, and can be used on the driver or passenger seats. The primary problem with this kind of caddy is that it is only secured by the strap around the headrest post, leaving it free to shift and swing upon sudden stops, starts or sharp turns. Again, safety of passengers, whether back seat or front seat riders, is a primary concern where the caddy may be used to safely support hot liquids.

Some caddies of this type are also multi-function as they may hold trash receptacles and/or include hinged trays. Where the caddy is of a type which is only secured at one point, however, the trash receptacle will swing out along with the caddy on sudden stops or starts, potentially causing a mess from spilled contents or at least annoying back seat passengers within range of the arc that the caddy or the bag. Further, the trays that are typically incorporated in this kind of caddy are too small to be used as a workspace and too shallow to feasibly hold food during operation of the vehicle, making them generally impractical. Finally, this kind of caddy makes it exceedingly difficult for back seat passengers to enter and exit their seats, especially if they must avoid bumping the caddy for fear of shifting it and spilling its contents.

Yet another conventionally available caddy is a saddle style caddy which has flaps that are designed to hug the transmission housing in a vehicle floorboard in either the vehicle's front or rear seats. Ideally the flaps are rubberized to prevent slippage with stops and starts, but top heavy drinks or other items still run the risk of ejection. Further, severely sudden stops may still shift the caddy, especially where the friction coefficient between the rubber and the floorboard is not high enough to prevent slippage.

One other issue with many of the conventionally available automobile caddies is that they offer few, if any, options with regard to organization of the support it makes available. Most have a limited number of features, include openings in predetermined sizes, and generally do not allow for customization with add-on components.

Telescoping stabilization caddies may also be available and typically include a vise-like mechanism by which they may be attached to a seat back. Often, however, this kind of caddy includes an extension arm which protrudes over the top edge of the seat, potentially causing discomfort to the passenger's head or neck or possibly even causing injury to a passenger's head or neck during sudden stops and starts, collisions, or any other incident which may force a passenger's head or neck onto the extension arms. Additionally, if the strength of the vise mechanism is at all questionable, this kind of caddy may be easily dislodged with even a minimal amount of force, whether from bumping the unit during exit or entry or during a collision or other sudden movement of the vehicle.

What is therefore needed is an auto caddy which is competitively priced yet offers multiple options for customization, such as the addition of a practically-sized work or food tray, dividers for organization of contents, and custom cup inserts, for example. The ideal caddy should be custom fittable to nearly any vehicle, will be easy to install, and should be readily transferrable from one vehicle to another. Finally, the ideal auto caddy may be mounted or installed in a vehicle in such a way that there may be little or no movement of the caddy during stops, starts, sharp turns, or other sudden vehicular movements, thereby minimizing the possibility that contents will be ejected in transit and, consequently, providing a much safer and more stable alternative than conventionally available caddies.

SUMMARY OF THE INVENTION

The auto caddy of the present invention may include a main housing having one or more molded compartments and may be mounted to the back of a vehicle seat for holding drinks or other items in a vehicle. Attachment members which accept slidable insertion of headrest seat posts of a vehicle (so that there are two points of attachment for each post) provide a higher degree of stability than is possible with other commonly available auto caddies and traditional attachment means. The auto caddy may be especially stable for safely holding such items when the vehicle is in motion, including, for example, during sudden starts and/or stops, sharp turns, collisions, or other sudden vehicle movement which is typically prone to eject compartment contents.

The auto caddy of the present invention may include one or more attachment members for attaching the caddy to the headrest seat posts of a vehicle. The attachment members may include one or more sets of openings which may be slipped over a set of headrest seat posts on installation, including a main opening on one side which may be used in combination with one of a plurality of openings opposite the main opening, the selection of which may depend on the angle of the headrest seat posts to which the caddy will be attached. Because each of the attachment members may ideally have at least two points of contact with the headrest seat post, the auto caddy of the present invention may be more level, more stable, and less likely to become dislodged than most conventional units. Further the attachment members enable the caddy to be vertically stabilize and support the caddy in an upright and stabilized way, rearward of the headrest seat posts. Where the auto caddy is manufactured with offset side surfaces shapes to minimize manufacturing costs and optimize ease of assembly, offset washers may be used at installation to maximize vertical and horizontal alignment and stability of the auto caddy.

The auto caddy of the present invention may also include optional components for subdividing its compartments to achieve a higher or customized level of organization. The auto caddy of the present invention may include one or more hooks from which a tray component may be suspended vertically or at an incline during non-use or which may alternatively be used to secure the tray component in a fixed horizontal or inclined position during use. The auto caddy may further include slots for suspending a trash receptacle such as a plastic grocery bag.

BRIEF DESCRIPTION OF THE DRAWINGS

The invention, its configuration, construction, and operation will be best further described in the following detailed description, taken in conjunction with the accompanying drawings in which:

FIG. 6 is a cross sectional view along line 6-6 of FIG. 5 which illustrates main housing, an end compartment, notch, front face, rear face, tray hook, and drain opening;

FIG. 7 is a first perspective end view of an attachment member which illustrates a through-bore, a contoured edge, and a first side opening;

FIG. 8 is a second perspective end view of the attachment member of FIG. 7 which illustrates a contoured edge and a plurality of side openings approximately opposite first side opening illustrated in FIG. 7;

FIG. 9 is an exploded perspective view of the auto caddy of the present invention, including housing, attachment member, offset washers, washers, screw, and bolt/screw;

FIG. 10 is a perspective view of a first main side of the offset washer(s) of FIG. 9;

FIG. 11 is a perspective view of a second main side of the offset washer(s) of FIGS. 9 and 10;

FIG. 12 is a side view of the offset washer(s) of FIGS. 10 and 11;

FIG. 16 is a top view of the tray, including openings from which the tray may be suspended, a main top surface, two indentations, a clip with lever, and raised sides;

FIG. 17 is a detail view along line 17-17 of FIG. 16 which illustrates the clip with lever;

DETAILED DESCRIPTION OF THE PREFERRED EMBODIMENT

Figure 1:
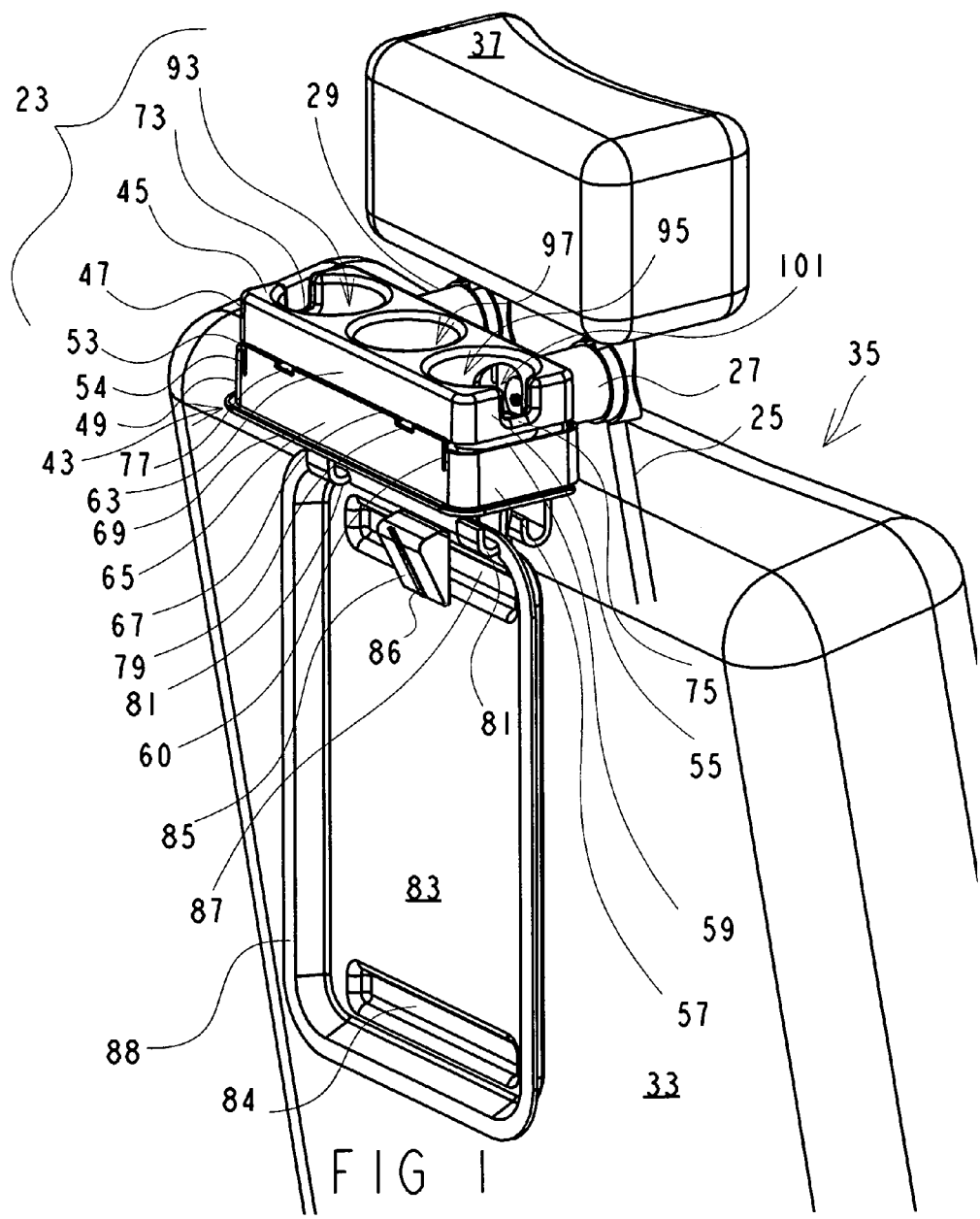
FIG. 1 is a perspective view of the auto caddy of the present invention attached to the headrest seat post of a vehicle, including a main housing, an attachment member, and a tray illustrated as suspended from a pair of hooks and shown in a vertically suspended position.

The invention, its configuration, construction, and operation will be best further described in the following detailed description, taken in conjunction with the accompanying drawings in which:

FIG. 1 is a perspective view of the auto caddy 23 of the present invention which illustrates the auto caddy 23 attached to a pair of headrest seat posts 25 by a first attachment member 27 and a second attachment member 29. Vehicle seat back 33 and headrest 37 are also shown in FIG. 1 for environmental completeness. Auto caddy 23 may include a housing 43 adjacent attachment members 27 and 29. Housing 43 may include a top surface 45, a first upper side wall 47, a first lower side wall 49, a first side slot 53 extending between first upper and lower side walls 47 and 49 and including a first front terminus 54, a second upper side wall 55, a second lower side wall 57, a second side slot 59 extending between second upper and lower side walls 55 and 57 and including a second front terminus 60, an upper front wall 63, a lower front wall 65, a front ledge 67 extending between upper and lower front walls 63 and 65, and a bottom lip 69. Although housing 43 is illustrated with front ledge 67 for ease and economy of manufacturing, upper front wall 63 and lower front wall 65 may conceivably be coplanar such that ledge 67 is eliminated.

First upper side wall 47 includes a notch 73, and second upper side wall 55 includes a notch 75 for accommodating a cup handle where the auto caddy 23 is used to support drinks. A first front bolt/screw access slot 77 and a second front bolt/screw slot 79 are illustrated between upper and lower front walls 63 and 65 adjacent ledge 67. Front bolt/screw access slots 77 and 79 allow for horizontally adjustable attachment of attachment members 27 and 29 to housing 43.

Also visible in FIG. 1 is one of a pair of hooks 81 from which a tray 83 may be suspended. Tray 83 is shown in a generally vertical position suspended from hooks 81, but can be infinitely adjusted to rest generally horizontally on the lap of nearly any user to provide a flat surface for working, eating or other activities. Tray 83 may be used while attached to hooks 81 or may be unhooked from hooks 81 and used separately. Tray 83 may include a first indentation 84 in which items may be placed to keep them from sliding around tray 83. Tray 83 may also include a clip 85 to secure items much like a traditional clipboard. Clip 85 may include a lever 86 by which it may be more easily openable. Tray 83 may include a second indentation 87 to keep tray 83 level if it is used separately, as on a table or other flat surface, for example. Finally, tray 83 may include raised sides 88 to keep contents from sliding off the tray 83 during use. Also seen are portions of a first end receptacle 93, a second end receptacle 95, and a middle receptacle 97.

Figure 2:
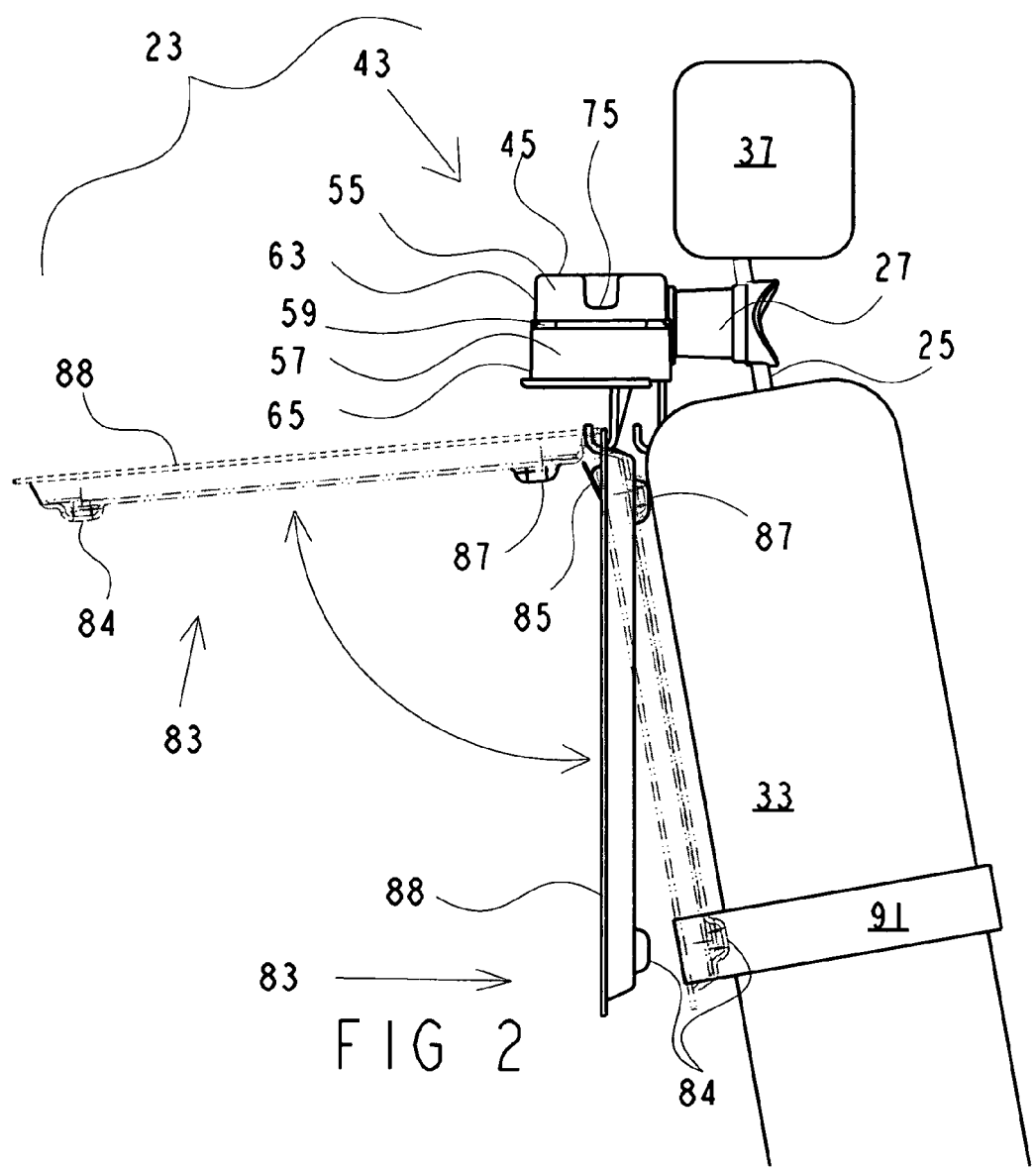
FIG. 2 is a side view of the auto caddy 23 of FIG. 1 which illustrates the extent to which the main housing is supported level as it projects rearwardly from the headrest post, and also illustrates the tray in dashed line format in a second generally horizontal position as it might be during use or just before disengagement from the main housing and in a third position as it might appear when attached to the seat by an optional strap.

FIG. 2 is a side view of the auto caddy 23 of FIG. 1 which illustrates tray 83 in dashed line format in a second generally horizontal position as it might be during use. Tray 83 may also be fully detached from hooks 81 and used independently of housing 43. Seat back 33 and headrest 37 are also shown in FIG. 2 for environmental completeness. Also visible in FIG. 2 is one of hooks 81, housing 43, including top surface 45, second upper side wall 55, including notch 75, second lower side wall 57, and second side slot 59, upper front wall 63, lower front wall 65, and attachment member 27. FIG. 2 also illustrates in dashed line format tray 83 as it would appear if secured to seat back 33 using an optional strap 91. Tray 83 may be inserted into strap 91 to prevent tray 83 from swinging during transit and potentially striking a back-seat passenger's knees.

Figure 3:
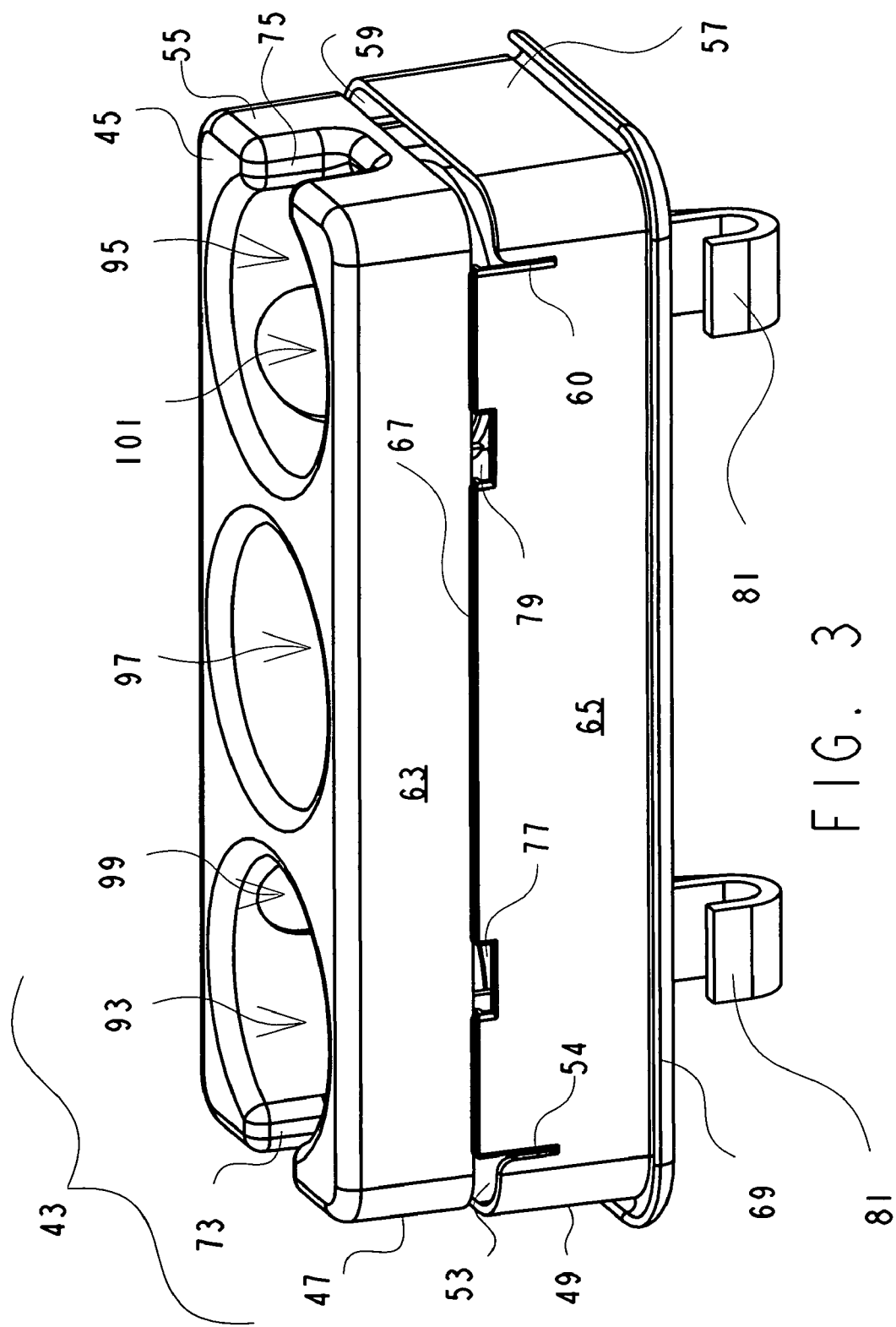
FIG. 3 is a perspective top view of the front of the main housing (the side of the housing which faces the rear seat user) of the auto caddy of the present invention, including end and center compartments, notches, a center compartment, tray hooks, side slots, bottom lip, and front openings.

FIG. 3 is a perspective top view of the front side of main housing 43 of the auto caddy 23 of the present invention, including top surface 45, upper front wall 63, lower front wall 65, front ledge 67, first upper side wall 47 with notch 73, first lower side wall 49, first side slot 53, second upper side wall 55, notch 75, second lower side wall 57, second side slot 59, ledge 67, bottom lip 69, first and second front bolt/screw access slots 77 and 79, and hooks 81. FIG. 3 illustrates first side slot 53 and second side slot 59 in more detail, including first front terminus 54 of first side slot 53 and second front terminus 60 of second side slot 59. Both first and second front termini 54 and 60 may be significantly narrowed relative to the width of first and second side slots 53 and 59 so that a bag handle may pass through either of first or second side slots 53 and 59 and into either of termini 54 and 60, which are designed to impinge the handle of a bag to help keep it in place inside slots 53 and 59 for suspending the bag from housing 43.

FIG. 3 further illustrates further details of the first end receptacle 93, second end receptacle 95, and middle receptacle 97. Also visible in FIG. 3 are more details of receptacles 93, 95, and 97, including an opening 99 in first end receptacle 93 and an opening 101 in second end receptacle 95, both of which be accessed for easier assembly of auto caddy 23, as will be detailed in later figures. Receptacles 93, 95, and 97 may be used to hold drinks or a variety of other items, and first and second end receptacles 93 and 95 may be especially suited to hold cups with handles, which may be more easily accommodated by notches 73 and 75, respectively.

Figure 4:
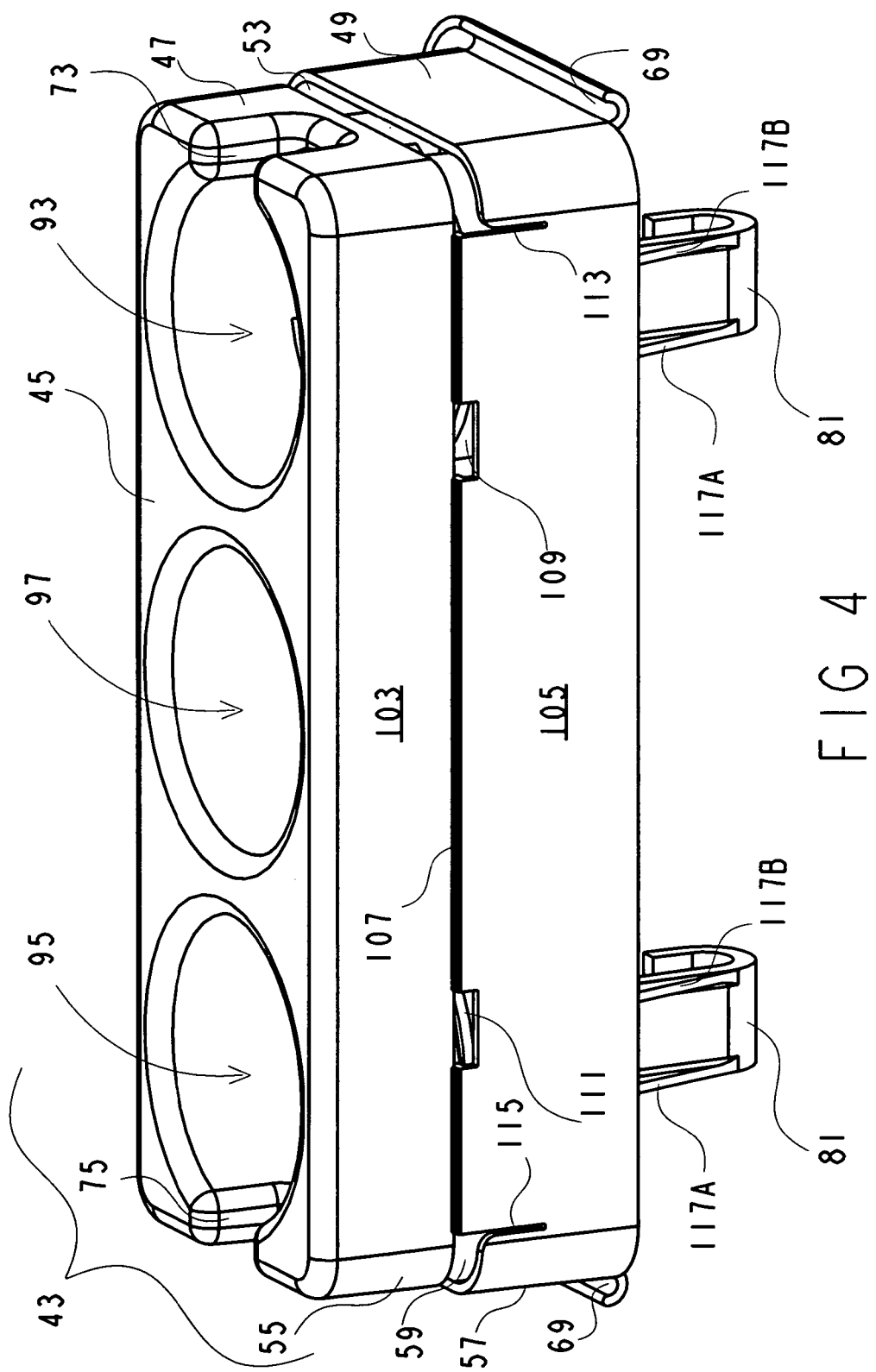
FIG. 4 is a perspective top view of the rear of the main housing of FIG. 3 (the side of the housing which faces the headrest posts when the caddy is in use) in which end and center compartments, notches, tray hooks, side slots, and bottom lip are illustrated, as are offset face and rear openings of main housing.

FIG. 4 is a perspective top view of the rear side of main housing 43, including top surface 45, first upper side wall 47 with notch 73, first lower side wall 49, first side slot 53, second upper side wall 55, notch 75, second lower side wall 57, second side slot 59, bottom lip 69, hooks 81, first end receptacle 93, second end receptacle 95, and middle receptacle 97. FIG. 4 further illustrates an upper rear wall 103, lower rear wall 105, and a rear ledge 107 extending between upper and lower rear walls 103 and 105. Also visible in FIG. 4 is a first rear bolt/screw slot 109 and a second rear bolt/screw slot 111, through which a bolt/screw may be passed during assembly and installation, as will be detailed in later figures. Bolt/screw slots 109 and 111 allow for adjustment (including horizontal or sideways) of attachment members 27 and 29 to accommodate different gaps between head rest seat posts 25 of different cars at installation, and also allow for assembly/installation of housing 43 in reverse of the direction shown in FIG. 1 if desired. Note that FIG. 4 illustrates first side slot 53 and second side slot 59 in more detail, including first rear terminus 113 of first side slot 53 and second rear terminus 115 of second side slot 59. Both first and second rear termini 113 and 115 may be significantly narrowed relative to the width of first and second side slots 53 and 59 so that a bag handle may pass through either of first or second side slots 53 and 59 and into either of termini 113 and 115, which are designed to impinge the handle of a bag to help keep it in place in slot 53 or 59. FIG. 4 also illustrates a pair of reinforcement structures 117a and 117b on the rear of each of pair of hooks 81 to help minimize the potential breakage of hooks 81.

Figure 5:
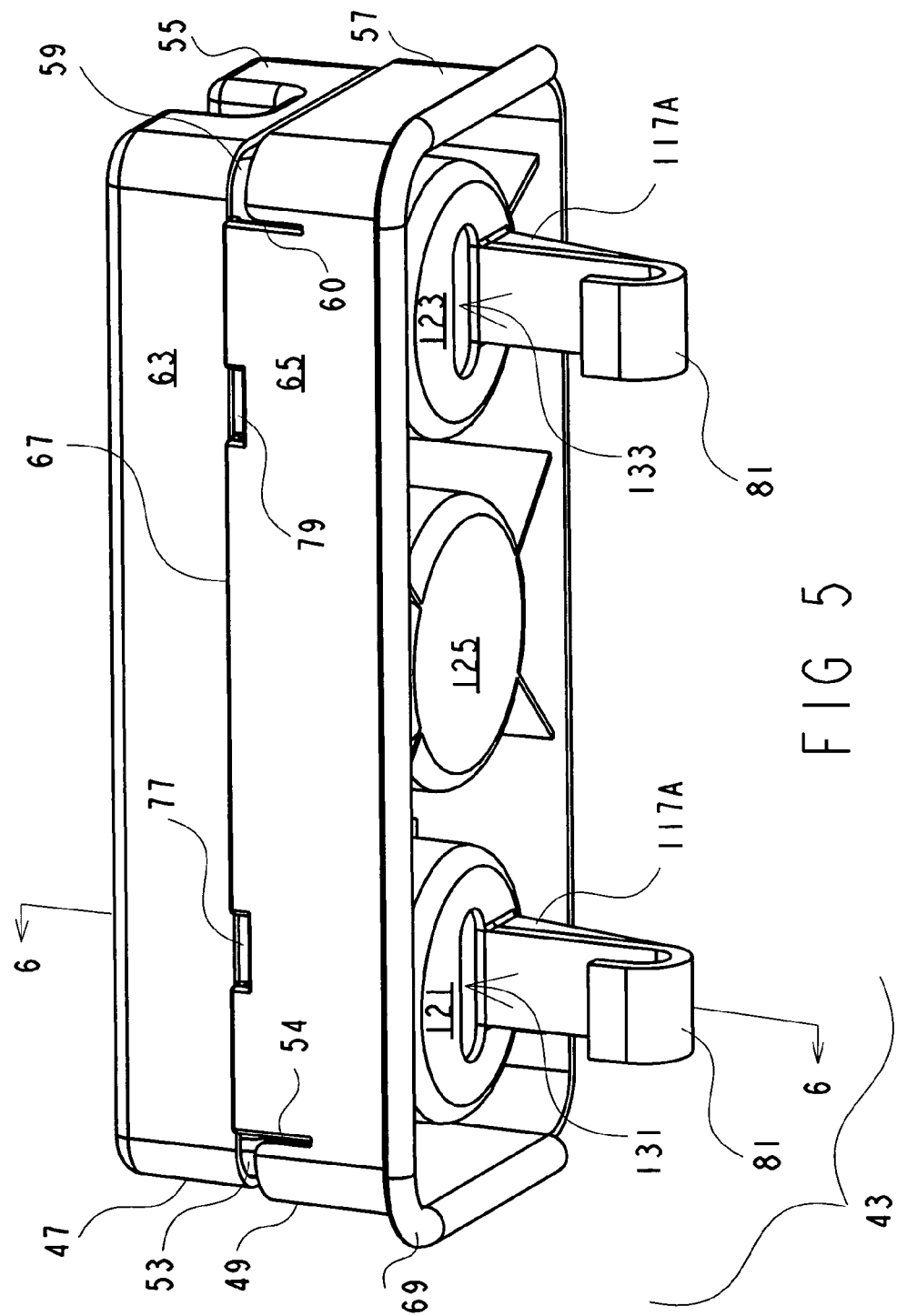
FIG. 5 is a perspective bottom view of the front of the main housing of FIGS. 3 and 4 in which notches, tray hooks, bottom lip, side slots, and the underside of end compartments, including drain openings, are seen.

FIG. 5 is a perspective bottom view of the front of the main housing 43 of FIGS. 3 and 4, including upper front wall 63, lower front wall 65, front ledge 67, first and second front bolt/screw access slots 77 and 79, first upper side wall 47, first lower side wall 49, first side slot 53 with first front terminus 54, second upper side wall 55 with notch 75, second lower side wall 57, second side slot 59 with second front terminus 60, bottom lip 69, and hooks 81 on which one of the reinforcement structures 117 may be seen. FIG. 5 further illustrates the bottoms 121, 123, and 125, respectively first end receptacle 93, second end receptacle 95, and middle receptacle 97. FIG. 5 also illustrates drain openings 131 and 133 of first and second end receptacles 93 and 95, respectively. Drain openings 121 and 123 allow air to circulate in receptacles 93 and 95 so that any spills or condensation (from cold drinks, for example) that may collect in the receptacles 93 and 95 may drain and or evaporate more quickly than it would otherwise.

FIG. 6 is a cross sectional view along line 6-6 of FIG. 5 (looking toward first end of main housing 43) which illustrates in more detail main housing 43, including top surface 45, upper front wall 63, lower front wall 65, front ledge 67, bottom lip 69, notch 73, first end receptacle 93, including drain opening 121, an upper receptacle wall 137, a lower receptacle wall 139, and an inner ledge 141. Lower receptacle wall 139 may be of a diameter which is smaller than that of upper receptacle wall 137, as shown, for accommodating specialized drink containers such as graduated travel mugs, for example. Also visible in FIG. 6 is upper rear wall 103, lower rear wall 105, rear ledge 107, and one of the pair of hooks 81 along with one of the reinforcement structures 117.

FIG. 6 illustrates a front accommodation space 143 between first end receptacle 93 and upper and lower front walls 63 and 65. First front bolt/screw access slot 77 opens into front accommodation space 143 (as does second front bolt/screw slot 79, not illustrated in FIG. 6). Likewise, FIG. 6 illustrates a rear accommodation space 145 between first end receptacle 93 and upper and lower rear walls 103 and 105 into which first rear bolt/screw slot 109 opens (as does second rear slot 111, not illustrated in FIG. 6). Accommodation spaces 143 and 145 are easily accessed from beneath housing 43 to simplify installation/assembly, and ideally they also provide sufficient clearance for any hardware necessary to install/assemble auto caddy 23, as will be detailed in later figures.

FIG. 7 is a first perspective end view of an attachment member 147 identical to the attachment members 27 and 29 illustrated in FIG. 1. Attachment member 147 has bottom 149 with through-bore 151, first wall section 157 extending between bottom 149 and a second wall section 159. Second wall section 159 may be greater in diameter and thickness than first wall section 157 and may extends between first wall section 159 and a third wall section 161 adjacent an open end 163. Third wall section 161 may be greater in diameter and thickness than second wall section 159, and the increasing thickness from first wall section 157 to third wall section 161 may help to strengthen attachment member 147 to prevent deformation of attachment member 147 from forces exerted on it either during or after installation. FIG. 7 illustrates a first side opening 173. First side opening 173 may begin at the intersection of second wall section 159 and third wall section 161 and may extend toward and into third wall section 161. Contoured edge 165 ideally minimizes the edge material which is not used for vertical stability and slightly increases the clearance into the area just forward of the pair of headrest seat posts 25.

FIG. 8 is a second perspective end view of the attachment member 147 of FIG. 7 which illustrates first wall section 157, second wall section 159, third wall section 161, and contoured edge 165. Also illustrated in FIG. 8 is a second side opening 175. Second side opening 175 may begin at the intersection of second wall section 159 and third wall section 161 and may extend toward and into third wall section 161. Second side opening 175 is approximately opposite (or possibly slightly offset) from first side opening 173. When auto caddy 23 is installed, the vehicle headrest may be removed so that attachment member 147, which may or may not be attached to housing 43 before installation in a vehicle, may be passed over the headrest seat post, allowing the headrest seat post to extend through two opposing openings on the attachment member 147 to maximize stability. For headrest seat posts which are essentially vertical, it is preferable to utilize first side opening 173 with second side opening 175 when fitting the attachment member 147 over the headrest seat posts. FIG. 8 illustrates a third side opening 177 along second wall section 159 which is adjacent second side opening 175 and approximately opposite and about 15 to 30 degrees offset from first side opening 173. Third side opening 177 may begin at the intersection of first wall section 157 and second wall section 159 and may extend toward and into third wall section 161. Where a vehicle's headrest seat posts (illustrated in later figures) are angled, it is preferable to utilize first side opening 173 with third side opening 177 when fitting the attachment member over the headrest seat posts. Further, the third side opening 177 has a curved terminus closer to the bottom 149 than the curved terminus of second side opening 175 which would cause the caddy 23 to assume a different support angle. Although attachment member 147 is illustrated as slightly frusto-conical in shape, note that it may be any of a number of shapes which allow the auto caddy 23 of the present invention to function as describe herein. First side opening 173 and second side opening 175 may ideally be the same distance from bottom 149, and third opening 177 may ideally be closer to bottom 149 than first and second side openings 173 and 175. By situating openings at different distances from bottom 149 and allowing attachment member 147 to be rotated about its longitudinal axis using through-bore 151, head rests of different angles may be accommodated.

FIG. 9 is a perspective view which illustrates a first attachment member 195 and a second attachment member 197, both of which are identical to attachment member 147 of FIGS. 7 and 8. First attachment member 195 is shown attached to housing 43 and second attachment member 197 is shown exploded away from housing 43, along with various components which may be used to connect attachment member 147 to housing 43, including a bolt/screw 181, first large washer 183, first offset washer 185, a second offset washer 187, second large washer 189, a small washer 191, and a nut 193. Alternatively, small washer 191 may interchangeably be a spring washer, split washer, spring, or similar component. Likewise, nut 193 may be exchanged for a nylock nut or similar component. Also visible in FIG. 9 are top surface 45 of housing 43, second upper and lower side wall 55 and 57, second side slot 59, upper and lower front wall 63 and 65, and bottom lip 69. Bolt/screw 181 attaches components 183 and 185 to main housing 43 and components 187, 197, 189, 191 and 193 and is accessible for tightening and/or loosening through opening 101 in compartment 95 or through bolt/screw slot 77 using a screwdriver, etc.

FIG. 10 is a perspective view of a first main side 201 of offset washer 185 (which is identical to washer 187) of FIG. 9, which includes a first surface 203, a second surface 205 which is offset from first surface 203 and separated from first surface 203 by a step 207. A through-bore 209 by which the washer 185 may be connected to other components opens onto first surface 203. A third surface 211 of offset washer 185 is also visible in FIG. 10. Where housing 43 is manufactured with offset sides as illustrated in previous figures, offset washers 185 and 187 may be used during installation to keep housing 43 as level as possible.

FIG. 11 is a perspective view of a second main side 213 of the offset washer 185 (and 187) of FIGS. 9 and 10 which includes a fourth surface 215 of the offset washer 185 onto which through bore 209 also opens. Third surface 211 is also visible in FIG. 11, as is the step 207.

FIG. 12 is a side view of the offset washer 185 (and 187) of FIGS. 9-11 and illustrates third surface 211 extending between first surface 203 and fourth surface 215 as well as between second surface 205 and fourth surface 215. Third surface 211 is also visible in FIG. 11, as is the step 207 seen directly in side profile.

Figure 13:
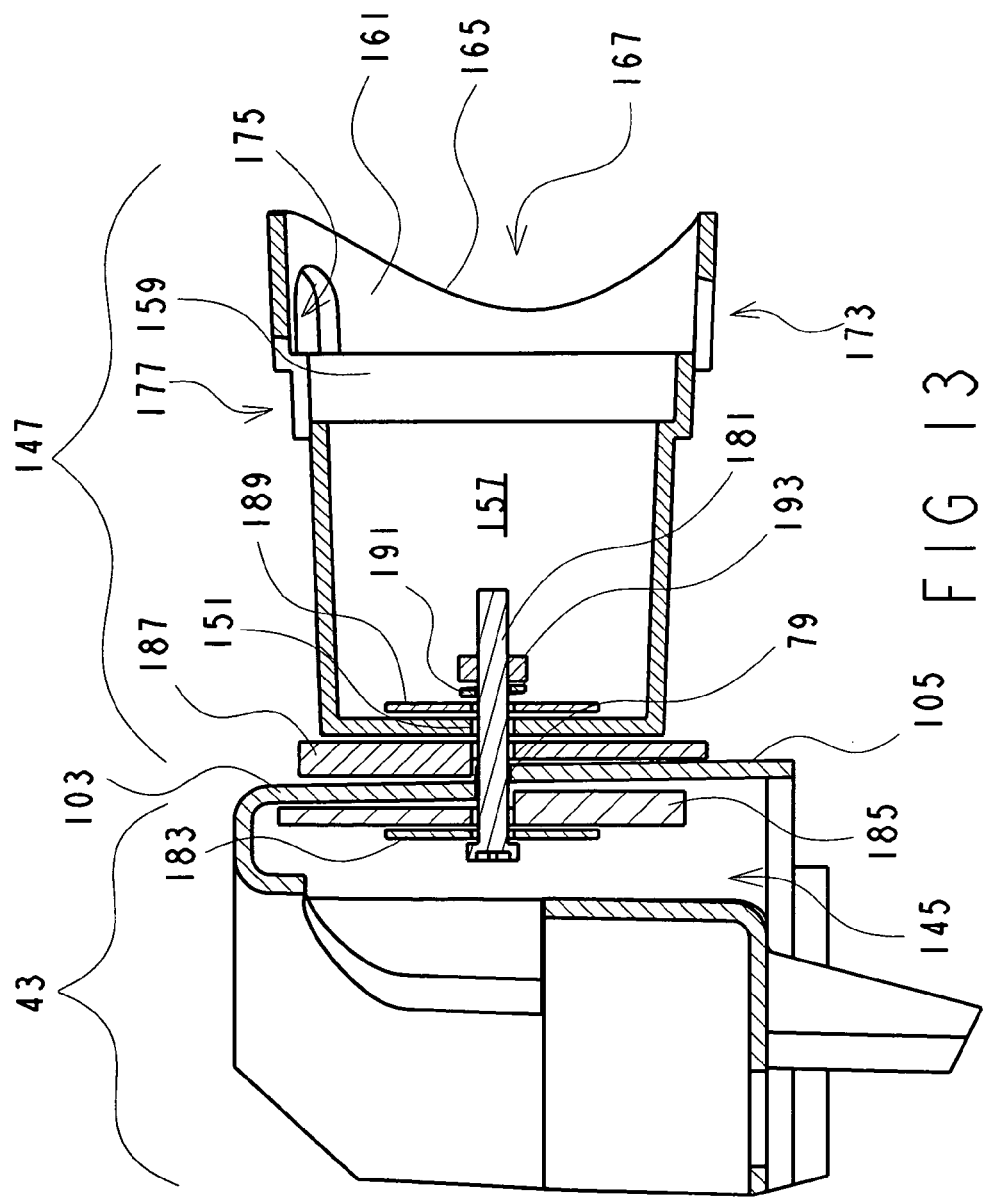
FIG. 13 is a cross-sectional view along line 13-13 of FIG. 9 which illustrates main housing attached to the attachment member, including two offset washers, washers, a nut, and a bolt/screw.

FIG. 13 is a cross-sectional view along line 13-13 of FIG. 9 which illustrates main housing 43 attached to attachment member 147. FIG. 13 also illustrates bisected first side opening 173, second side opening 175, and bisected third side opening 177 on member 147. First and second side openings 173 and 175 may be situated the same distance from bottom 149. Third side opening 177 is intact and may be situated closer to bottom 149 than first and second side openings 173 and 175. Bolt 181 extends from rear accommodation space 145, in turn, through first large washer 183, first offset washer 185, second rear bolt/screw slot 111, second offset washer 187, through bore 151 in bottom 149 of attachment member 147, second large washer 189, small washer 191, and finally through nut 193. Also visible in FIG. 13 are upper and lower rear walls 103 and 105, first wall section 157, second wall section 159, third wall section 161, edge 165, and third side opening 177 of attachment member 147. Because attachment member 147 is cup-like, nut 193 may be accessed using a tool such as pliers through opening 167.

Although FIG. 13 illustrates a specific hardware arrangement for connecting main housing 43 to attachment member 147, it should be noted that there may be an infinite variety of ways in which main housing 43 may be connected to attachment member 147, and the components as shown in FIG. 13 are in no way exclusive of any other arrangement which allows the auto caddy 23 of the present invention to function as intended.

Figure 14:
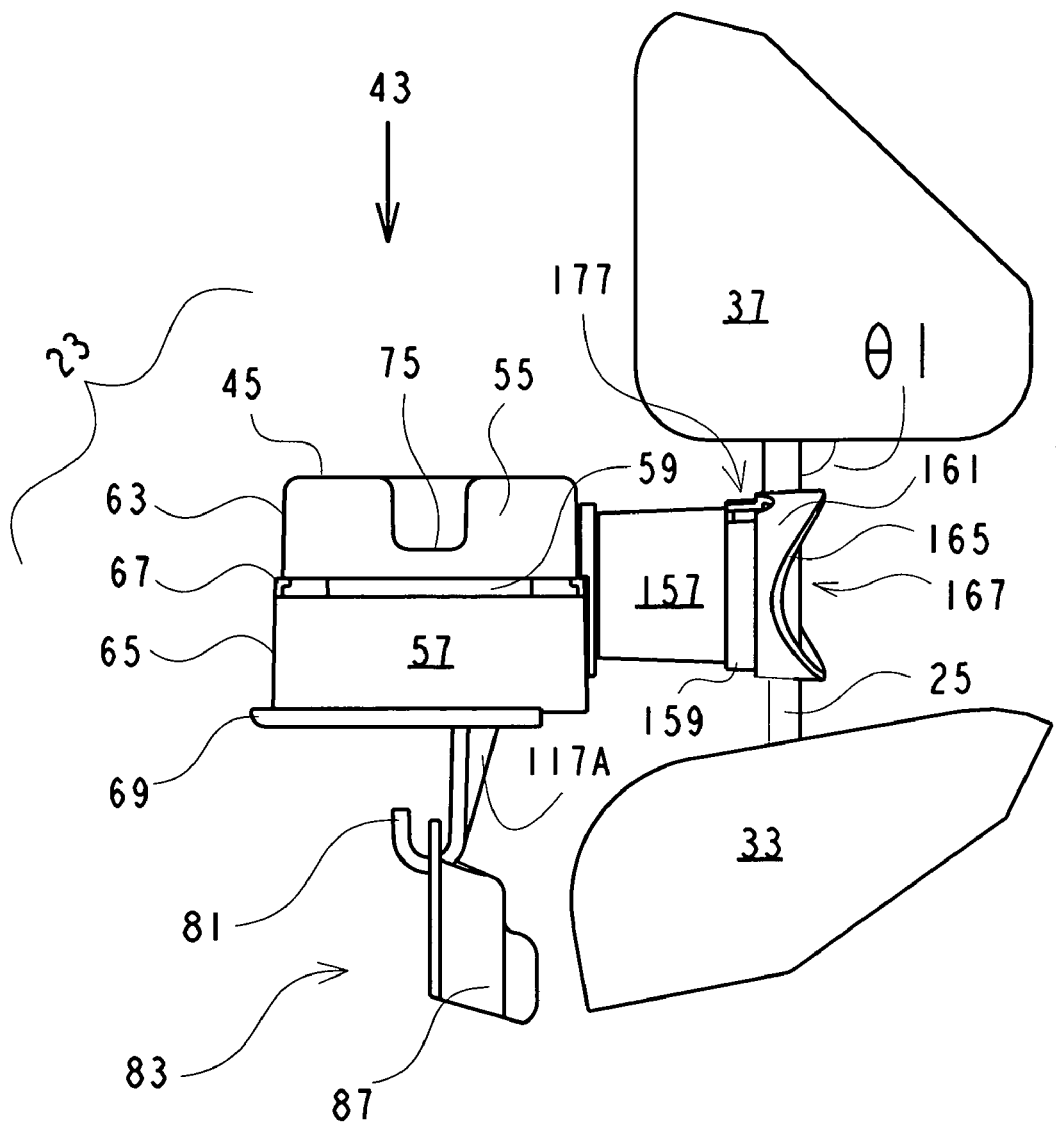
FIG. 14 is a side view of the auto caddy of the present invention as attached to a vertical headrest seat post by the attachment members, including a tray suspended from tray hooks and showing the angle of the headrest seat post with respect to the flange of the attachment member.

FIG. 14 is a detailed side view of the auto caddy 23 of the present invention identical to that shown in FIG. 1. Visible in FIG. 14 is one of headrest seat posts 25, seat back 33, headrest 37, second attachment member 29, and housing 43, including top surface 45, second upper side wall 55 with notch 75, second lower side wall 57, second side slot 59, upper front wall 63, lower front wall 65, and front ledge 67. In FIG. 14, the angle between the headrest seat post 25 and the horizontal, labeled θ1, is approximately 90 degrees. In this situation, with reference again to FIG. 8, headrest seat post 25 may preferably be passed through first side opening 173 and second side opening 175 of attachment member 29 so that the auto caddy 23 is as level as possible once installed. Note that θ1 is used to indicate a headrest seat post which is perpendicular to the ground.

Figure 15:
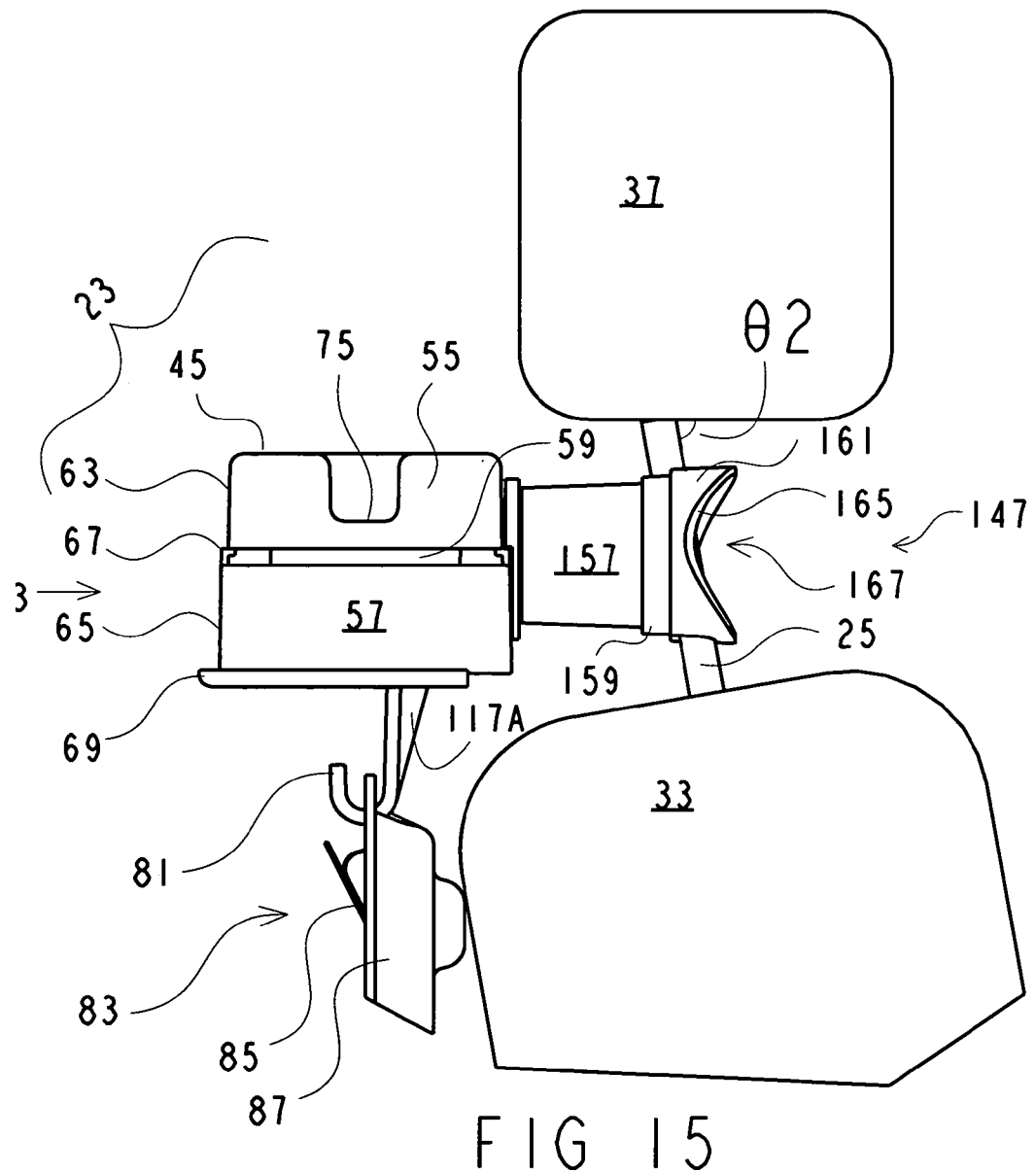
FIG. 15 is a side view of the auto caddy of the present invention as attached to an angled headrest seat post by the attachment member, including a tray suspended from tray hooks and showing the angle of the headrest seat post with respect to the flange of the attachment member.

FIG. 15 is another detailed side view of the auto caddy 23 of the present invention identical to that shown in FIG. 1. Visible in FIG. 15 is one of headrest seat posts 25, seat back 33, headrest 37, attachment member 147, and housing 43, including top surface 45, second upper side wall 55 with notch 75, second lower side wall 57, second side slot 59, upper front wall 63, lower front wall 65, and front ledge 67. In FIG. 15, the angle between the headrest seat post 25 and the horizontal, labeled θ2, is less than 90 degrees because of the angled headrest seat post 25. In this situation, with reference again to FIG. 8, headrest seat post 25 may preferably be passed through first side opening 173 and third side opening 177 of attachment member 147 so that the auto caddy 23 is as level as possible once installed.

FIG. 16 is a top view of tray 83, including first indentation 84, clip 85, second indentation 87, raised sides 88, main top surface 223, and pair of openings 225 from which the tray 83 may be suspended from hooks 81 (not illustrated in FIG. 16).

FIG. 17 is a detail view along line 17-17 of FIG. 16 which more closely illustrates clip 85. Clip 85 may include lever 86 by which it may be more easily pried opened and may function like a clipboard to keep objects, such as papers and the like, in place on tray 83.

Figure 18:
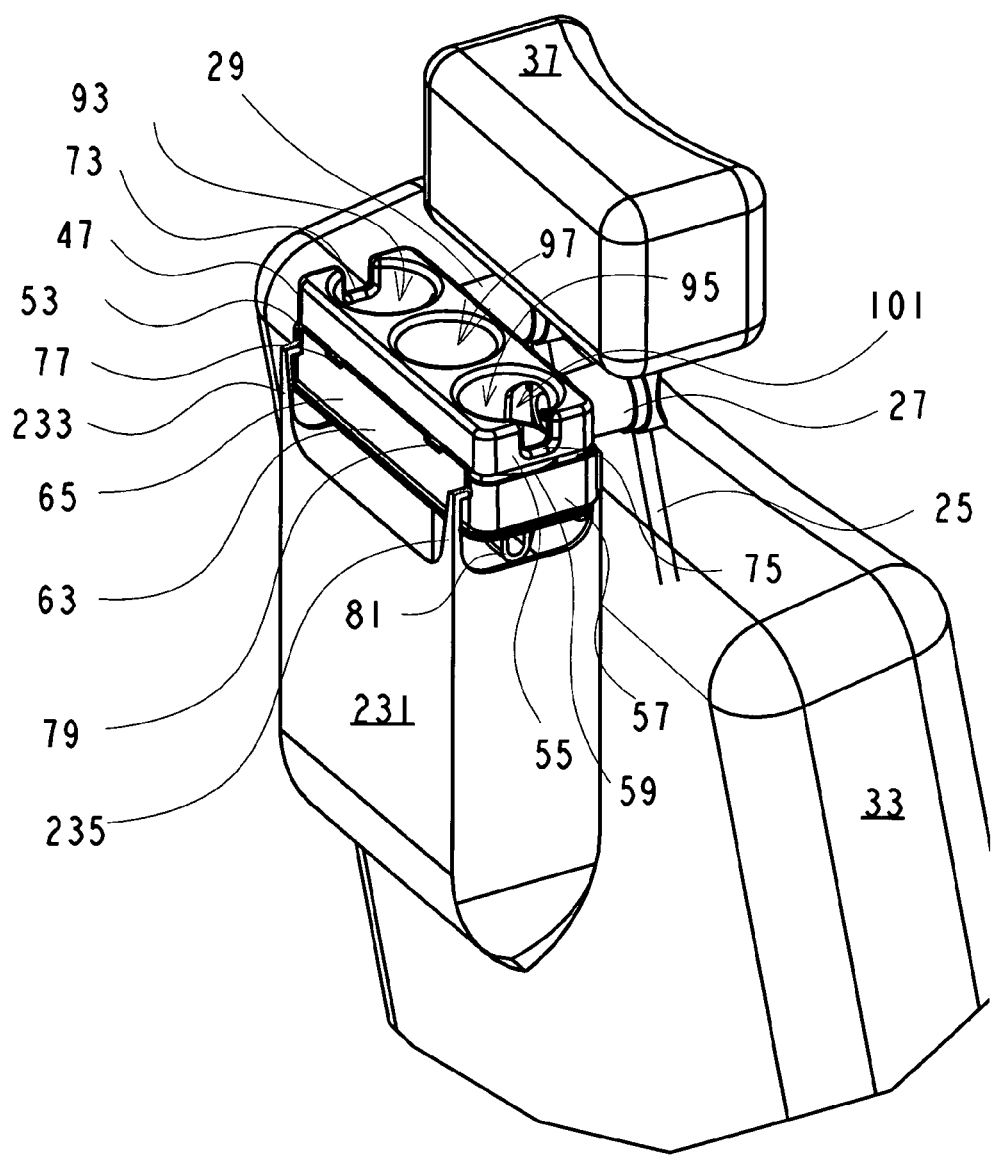
FIG. 18 is a perspective view of the auto caddy of the present invention as attached to a headrest seat post by attachment members and illustrates a shopping bag suspended from the auto caddy.

FIG. 18 is a perspective view of the auto caddy 23 of the present invention which illustrates the auto caddy 23 attached to a pair of headrest seat posts 25 exactly as illustrated in FIG. 1 except that in FIG. 18 tray 83 has been replaced by a bag 231 having a first handle 233 and a second handle 235. First handle 233 is located in first side slot 53, then it is slid into termini 54 and 113 of housing 43 and second handle 235 is located in second side slot 59, then it is slid into termini 60 and 115 of housing 43 so that bag 231 is suspended from housing 43 and may be used as a receptacle or an additional storage space, for example. Note that hooks 81 may also be used to suspend a bag such as bag 231. Bag 231 may be used regardless of whether tray 83 is in place on hooks 81, and may ideally be suspended in front of tray 83 when tray 83 is suspended from hooks 81. Where a user wishes to utilize tray 83 while bag 231 is in place, one side of bag 231 may be temporarily removed from its corresponding slot 53 or 59 so that tray 83 may be accessed.

Figures 19, 20:
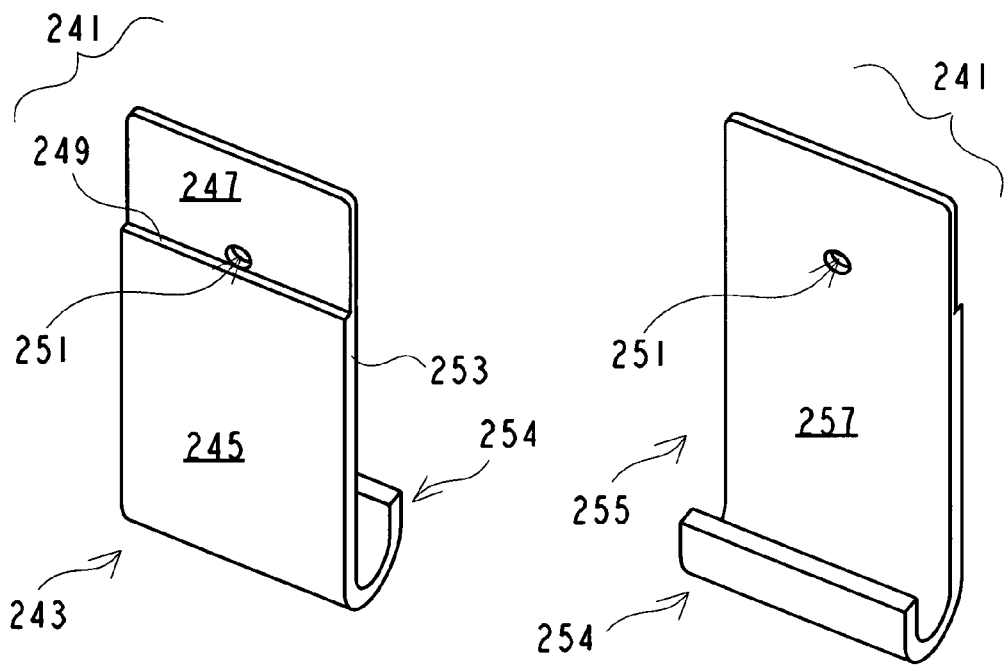
FIG. 19 is a perspective view of a first main side of a hook-shaped offset washer which is an alternative to the offset washer shown in FIG. 9.
FIG. 20 is a perspective view of a second main side of the hook-shaped offset washer of FIG. 19.

FIG. 19 is a perspective view of a hook-shaped offset washer 241, which is a possible alternative to offset washer 185 shown in FIGS. 10 through 12. Hook-shaped offset washer 241 includes a first main side 243 which includes a first surface 245, a second surface 247 which is offset from first surface 245 and is separated from first surface 245 by a step 249. A through-bore 251 by which the washer 241 may be connected to other components opens onto first surface 245. A third surface 253 of offset washer 241 is also visible in FIG. 19. Hook-shaped washer 241 includes curved end 254 by which a tray such as tray 83 (not illustrated in FIG. 19) may be suspended.

FIG. 20 is a perspective view of a second main side 255 of the hook-shaped offset washer 241 of FIG. 19 which includes a fourth surface 257 onto which through bore 251 also opens. Third surface 253 is also visible in FIG. 20, as is the step 249 and curved end 254.

Figure 21:
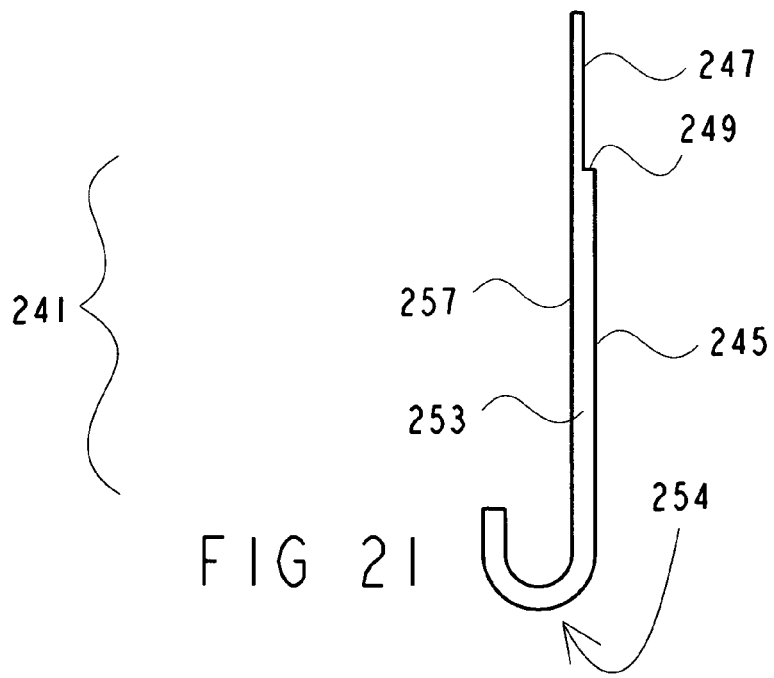
FIG. 21 is a side view of the hook-shaped offset washer of FIGS. 19 and 20; and, FIG. 22 is identical to the cross-sectional view along line 13-13 of FIG. 9 which illustrates main housing attached to the attachment member with two offset washers, washers, a nut, and a bolt/screw, except that it illustrates one of the two offset washers as a hook-shaped offset washer as shown in FIGS. 19 through 21.

FIG. 21 is a side view of the hook-shaped offset washer 241 of FIGS. 19 and 20 and illustrates third surface 253 extending between first surface 245 and fourth surface 257 as well as between second surface 247 and fourth surface 257. Third surface 253 is also visible in FIG. 21, as is the step 249 and curved end 254 seen directly in side profile.

FIG. 22 is a cross-sectional view which is identical to FIG. 13 except that washer 185 has been replaced with hook-shaped washer 241 in FIG. 22. Hook-shaped offset washer 241 may eliminate the need to include a molded hook such as hook 81. Like FIG. 13, FIG. 22 illustrates main housing 43 attachment member 147, first side opening 173, second side opening 175, and third side opening 177 on member 147, bolt 181, rear accommodation space 145, first large washer 183, second rear bolt/screw slot 111, second offset washer 187, through bore 151 in bottom 149 of attachment member 147, second large washer 189, small washer 191, nut 193, upper and lower rear walls 103 and 105, first wall section 157, second wall section 159, third wall section 161, edge 165, and third side opening 177 of attachment member 147. Hook shaped offset washer, by its shape and position, eliminates the need to take out one side of the bag to access tray 83 as described in FIG. 18.

Finally, although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An auto caddy comprising:
    a main housing having a first end, a second end opposite said first end, a first side extending between said first and second ends, and a second side opposite said first side and extending between said first and second ends;
    and wherein said main housing further includes a top surface, said top surface defining at least one receptacle integrally formed in said housing, the receptacle being generally cylindrical in shape and having an open top, wherein said main housing includes a bottom surface;
    a pair of attachment members, each of said attachment members having a first end, a second end, and generally cylindrical sides walls, open on an interior and extending between said first and second ends, and further comprising a first side opening adjacent said second end and a second side opening adjacent said second end and approximately opposite and spaced apart from said first opening, and wherein said first end is attached to said main housing and said second end is attachable to a headrest seat post of a vehicle by sliding said first and second side openings of each of said attachment members successively over a vertical or close to vertical headrest seat post; and a third side opening, adjacent said second end of said attachment member, adjacent to and offset from said second side opening, and wherein said attachment member is attachable to a headrest seat post by sliding said first and third side openings successively over an angled headrest seat post;

wherein the generally cylindrical side walls are configured to rotate or slide to switch between use of the first and second side openings of each of said attachment members successively over a vertical or close to vertical headrest seat post and, alternatively, use of the first and third side openings successively over an angled headrest seat post.

2. The auto caddy recited in claim 1 wherein said main housing includes at least one accommodation space adjacent said at least one receptacle, and wherein said at least one accommodation space is sufficient to accommodate hardware necessary to attach said main housing to said attachment members, and wherein said receptacle includes an opening for accessing said at least one accommodation space during installation.

3. The auto caddy recited in claim 2 wherein first and second sides of said main housing include at least one bolt/screw slot through which a bolt/screw may be extended for adjustably attaching said main housing to said at least attachment member.

4. The auto caddy recited in claim 3 wherein each of said first and second ends of said main housing includes an end slot into which the handle of a bag may be inserted for suspending said bag.

5. The auto caddy recited in claim 4 wherein each of said end slots includes a narrowed terminus for impinging said handles of said bag to help keep said handles in said slots.

6. The auto caddy recited in claim 5 and further comprising at least one hook projecting from said bottom surface of said housing.

7. The auto caddy recited in claim 6 and further comprising a tray, said tray including at least one opening by which said tray is selectably suspendable from said at least one hook.

8. The auto caddy recited in claim 7 wherein said tray has a top main surface which includes a first indentation for supporting writing utensils and other small items.

9. The auto caddy recited in claim 8 and further comprising a second indentation, said second indentation similar in size and depth to said first indentation to enable said tray to stably rest on a flat surface.

10. The tray recited in claim 9 and further comprising a clip attached to said tray for holding objects in place on said tray.

11. The clip recited in claim 10 and further comprising a lever by which said clip may be pried open.

12. The auto caddy recited in claim 10 wherein said receptacle includes a notch for accommodating the handle of a drink container.

13. The auto caddy recited in claim 11 wherein said second end of said attachment member is contoured.

14. The auto caddy recited in claim 13 wherein said first and second sides and said first and second ends include a upper portion and a lower portion, and wherein said upper and lower portions are offset from one another.

15. The auto caddy recited in claim 14 wherein at least one offset washer is interposed between said main housing and said attachment members so that said main housing is generally level when attached to said headrest seat posts.

16. The auto caddy recited in claim 15 wherein said at least one receptacle includes an opening for draining condensation and promoting air circulation within said receptacle to prevent mold.

17. The attachment member recited in claim 16 wherein said first end includes a through bore.

18. The auto caddy recited in claim 17 wherein said main housing is attached to said attachment member by a nut and bolt/screw arrangement.

19. The auto caddy recited in claim 17, and further comprising a strap by which said tray may be secured to a vehicle seat back to prevent said tray from swinging during transit.

20. The auto caddy recited in claim 17 wherein said at least one offset washer is a hook-shaped washer.

* * * * *